3,319,404
DUST UNLOADER
Wilfred W. Lowther, Chicago, Ill., assignor to Novo Industrial Corporation, New York, N.Y., a corporation of New York
Filed Apr. 21, 1965, Ser. No. 453,867
5 Claims. (Cl. 55—432)

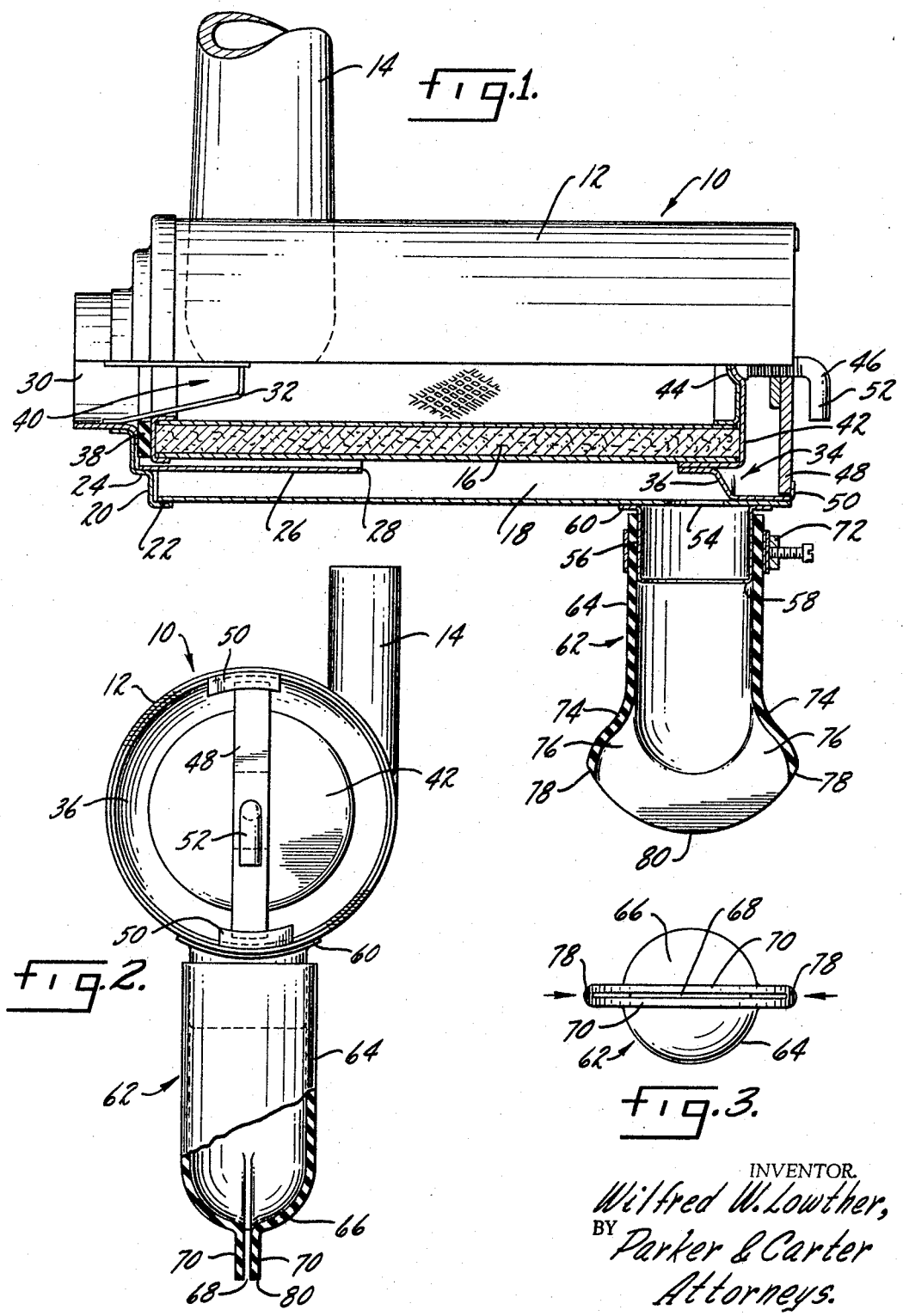

This is a continuation-in-part of Ser. No. 350,719, filed Mar. 10, 1964, now abandoned, which was a continuation-in-part of Ser. No. 159,958, filed Dec. 8, 1961, now abandoned, which was a continuation-in-part of Ser. No. 90,246, filed Feb. 20, 1961, now abandoned.

This invention is in the field of air cleaners and is concerned with an air cleaner which is completely dry in operation, meaning that it does not use any oil or fluid as a part of or in connection with its cleaning cycle.

A primary object of my invention is an automatic dust discharge device for an air cleaner.

Another object is a dust discharge device for an air cleaner which will automatically allow dust, separated from the air, to be discharged from the housing in response to a certain dust head pressure or build-up in response to the engine created air pressure differential.

Another object is an all dry air cleaner which requires greatly reduced maintenance.

Another object is a head pressure responsive dust unloader and adapter assembly for use on an air cleaner constructed to stand up and retain its dimensional stability even under the high loads and speed on the engine.

Another object is a dust unloader of the above type which can be easily cleared if jammed or clogged.

Another object is an air cleaner for automotive use which does not require a constant volume dust jar or chamber.

Another object is an all dry air cleaner for automotive use and the like which is greatly simplified and substantially less expensive to manufacture.

Another object is a dust unloader for an air cleaner which will fully unload and discharge all dust when the engine is shut down.

Another object is a flexible dust unloader which will not crack, split or fatigue in use.

Another object is a dust unloader which will retain its dimensional stability under the high pressure differentials resulting from maximum load and speed on the engine.

Another object is a method of discharging dirt and dust from an air cleaner on a continuous basis, while the unit is in operation.

Another object is a compact air cleaner for use with automotive engines, such as tractors, trucks and the like, which does not require that the dust separated from the air be periodically discharged—it automatically discharges or unloads.

Another object is an air cleaner of the above type in which the overall length of the air cleaner housing is not increased by any sort of dust cup or container.

Another object is an air cleaner of the above type which, everything else being equal, has more cleaner surface for the same axial underhead space.

Another object is an air cleaner of the above type which will have a greater capacity when confined to a given underhood space.

Other objects will appear from time to time in the ensuing specification and drawings in which:

FIGURE 1 is a side view, partly in section, of my new air cleaner;

FIGURE 2 is an end view of FIGURE 1, partly in section; and

FIGURE 3 is a bottom view of the dust unloader in FIGURES 1 and 2, partly in section.

In FIGURE 1, the air cleaner has been indicated generally at 10 and includes a generally cylindrical housing 12 having an inlet 14 which may be arranged tangentially at one end to admit dirty air to be cleaned. The air enters through the inlet moving tangentially to the inside of the housing, as shown in FIGURE 2, and flows into a rotary or swirling motion. A filter element 16, which is generally cylindrical and annular, is positioned in the housing and has an outside diameter which is substantially less than the inside diameter of the housing. Thus, an air swirl zone 18 is set up in an annular, somewhat cylindrical space, which extends substantially or approximately the entire length of the housing. One end of the housing is closed by the end cap 20 which may be welded or otherwise suitably connected to the housing, as at 22. I provide an offset 24 in the end cap into which the baffle or sleeve 26 is fitted which extends a short distance toward the other end of the housing and terminates at 28. It will be noted that the sleeve or air baffle 26 has a diameter somewhat greater than the outside diameter of the filter element 16 so that the entire length of the filter element may be used and the portion surrounded by the sleeve 26 is not blocked off.

The end cap has centrally arranged clean air discharge or outlet 30. In the center of the outlet, a four spoke bale or pilot 32 may be positioned which functions to accurately seat the filter element 16 when it is inserted through the other end 34 of the housing. It will be understood that the end 34 of the housing is generally open except for a ring 36 which serves to support the right end of the filter element 16 in a somewhat central portion. I may use an annular seal of rubber or the like, as at 38, to prevent dirt and dust from bypassing the filter element and going directly into the clean air outlet 30.

The left end of the inside of the filter element 16 is open, as at 40, while the right end is closed by a cap 42 having a central depression 44 which cooperates with a thrust stud 46 or the like. The stud is threaded through a cross bracket 48, the outer ends of which fit behind two ears 50 connected to the housing, so that when the handle end 52 of the thrust stud is rotated, the filter element will be forced firmly against the seal 38 and end cap 20.

The housing has a dust port 54 which is surrounded by an adapter 56 mounted by welding or the like on the outside of the housing. The adapter may be generally cylindrical with a turned in lower edge 58 and a turned out upper edge or flange 60 which may be welded or otherwise suitably connected to the housing and takes on a saddle appearance so that it conforms to the cylindrical outer surface of the housing.

It will be noted in FIGURE 1 that the adapter presents a smooth, cylindrical, outer surface for a predetermined distance below the dust port 54 and has a degree of volume.

A dust unloader, indicated generally at 62, is positioned on the adapter which takes on the form of a generally cylindrical upper portion 64 telescoped around the adapter and then hemisphered in at 66 to a discharge passage 68 defined between a pair of generally parallel, closely spaced lips 70. The entire unloader may be made of a rubberlike material or rubber substitute or any suitable material having the general characteristics of rubber as to flexibility and elasticity. The unloader may be simply slipped onto the adapter and may be slightly undersize to provide a compression fit. The upper portion of the unloader may be smooth on its exterior surface, or it may have a suitable roll or bead inside. The fit between the upper cylindrical portion 64 of the unloader and the cylindrical body 56 of the adapter, while sufficiently tight to prevent leakage, is, nevertheless, sufficiently loose so that the unloader may be rotated by hand to orient the discharge slot 68 in any desired position. To hold it in a fixed position, a clamp 72 or the like may be used of any suitable construction. The clamp may be easily removed and the unloader may be physically rotated or removed by hand for cleaning, repair or replacement.

It will be noted that the reduced portion 66 between the cylindrical upper part and the lips is somewhat hemispherical, but at the meeting line on the inside, the walls flare outwardly at 74 so that the effective width of the slot 68 may be greater than the diameter of the passage through the cylindrical part or body and the adapter.

As the lips flare out, the passage or opening widens on each side, as at 76, with the outer edges staying in contact and forming a joint clear out to the terminal point, as at 78. It will be noted that the lower edge of the lips, as at 80, is swung on a suitable radius which more or less conforms to, but does not precisely match, the radius or arc of the hemispherical portion 66. Thus, the lips themselves both appear to be swung on an arc, which laps or overlies both sides of the hemispherical portions somewhat, and extend in arcuate extent something on the order of from 70° to 90°.

The discharge slot has been shown as centrally located, or on the diameter of the cylindrical upper part 64. But it should be understood that it may be offset to one side or the other, possibly out to a tangent to either edge.

While two lips have been shown, closely spaced to form one discharge slot, it should be understood that the unloader may have four lips, crossing each other, to provide a cross tie discharge. Or any suitable number of lips and slots may be used. For example, one set on one side and another on the other may be used, disposed generally parallel, and each being tangent to the edge or between the edge and the central axis.

The important point is that the unloader should have at least two generally parallel, closely spaced, highly flexible lips defining a discharge slot. Also, the adapter and upper portion of the unloader provide a sufficiently large chamber so that dust may accumulate. It will be understood that a certain accumulation of dust will cause a head pressure above the lips 70 which, at a predetermined head pressure, will cause the lips to separate and flex outwardly, thereby opening up the discharge slot letting dust escape from the housing through the unloader.

Depending upon the service requirements of the unit and the installation involved, the size of the chamber above the flexible lips may be changed to vary the effective unobstructed height of the dust column. In the arrangement shown in FIGURE 1, the dust unloader has been pushed as far up on the adapter as it will go. But it should be understood that if a larger volume is desired so that a higher dust column may be obtained, the dust unloader may be slipped down somewhat to an intermediate position on the adapter, thereby enlarging the available volume for dust. Or the adapter can be lengthened.

The invention works particularly well with a 1 to 6 cylinder engine where the staggered intake pulsations of the cylinders are perceptible in the intake. With a large number of cylinders, for example 8 or 12, the intake pulsations may be so close together that the pulses at the intake are not sufficiently perceptible to be effective. In any event, where they are definite and perceptible, they cause a pulsating of the lips 70 which increases the effectiveness of the unloading action.

The use, operation and function of the invention are as follows:

An all dry air cleaner is provided which is composed basically of a housing and an inlet for dirty air, constructed and arranged to set up a helical swirl of dirty air. This helical swirl of dirty air is around a filter element which is generally annular and cylindrical. Centrifugal force will cause the dust and dirt in the air to move or be thrown to the outside and the cleaner air on the inside of the helical swirl will be drawn through the filter element and discharged through the clean air outlet. It will be understood that the clean air outlet is normally connected to the suction or intake of an internal combustion engine, be it diesel, multi fuel, gasoline, or what have you. The housing is constructed so that when the filter element has become sufficiently clogged with dirt and dust, it may be removed and cleaned or replaced and then reinserted.

At one end of the housing, a suitable dust port is positioned. While only one has been shown in the drawings, it should be understood that one or more dust ports may be used. In any event, the outside of the dust port is surrounded with a discharge chamber which in this case is made up of an adapter with a dust unloader telescoped on it.

The dust unloader itself may be molded of a suitable rubber or rubber substitute or plastic. The result is a highly flexible dust unloader with at least two closely spaced, generally parallel lips defining a thin, elongated slot which is constructed to enlarge as the lips flex due to the head pressure of the dust column above them.

During operation of the engine, a slight vacuum exists inside of the housing due to the suction of the engine. Thus, the air pressure inside of the housing is somewhat lower than the atmospheric air pressure on the outside. This tends to close the lips. The result is that a certain head pressure of dust in the chamber will be required to overcome this pressure differential and force the lips open. As soon as the engine stops and the pressure inside the clean air housing becomes atmospheric, the dust unloader will immediately unload since the pressure differential has been removed.

It should be understood that an air cleaner of this type may be used on either a supercharged or a naturally aspirated engine. In either case, the maximum air pressure differential across the dust unloader will be when the engine is at maximum speed and load. Depending upon the installation, this can amount to something on the order of 2 to 3 inches of water vacuum. The point is that at full load and speed on the engine, the maximum air pressure differential will be affected across the dust unloader. And it is very important that the dust unloader retain its dimensional stability and shape or form and not completely collapse. For example, under the maximum air pressure differential, the lips 70, of course, will be in contact with each other, but the portion of the unloader above the lips, for example the hemispherical portion 66 and the side wall 64, should be in the same general configuration and shape as shown in FIGURE 2. Thus, the structure of the unloader, directly above the lips, referring to the hemispherical portion 66, should be such that at the maximum pressure differentials encountered in the particular application, the unit should retain its operating form and shape. If the side walls are allowed to collapse, the dust will not flow steadily between the lips and discharged, and further the head height column above will be substantially reduced or changed.

It should also be noted that to completely discharge the dust unloader, the lips can be flexed simply by pushing one end toward the other with the fingers, as indicated by the arrows in FIGURE 3. This will greatly enlarge the opening since each of the lips will flex outwardly away from each other and all of the dust in the unloader and adapter will discharge.

While the dust unloader has been shown applied to what is termed a horizontal cleaner, it should be understood that it may be applied as well to a vertical cleaner. This is to say that the housing in FIGURE 1 could be turned upright. In that case, the unloader itself would be disposed with the lips and discharge slot still down.

In use, if the lips and slot should become clogged due to mud and water or possibly frozen, the unit can be very simply cleared by flexing the lips by hand to break loose any mud, ice, dust, or what have you. If any solids get inside of the dust unloader and tend to jam or clog the lips, it can be opened up by flexing one end toward the other, as indicated by the arrows in FIGURE 3, which will allow large objects to pass.

While the dimensional stabilizing structure has been shown and described as hemispherical portions, as at 66 in the drawings, it should be understood that the precise structure used may be varied extensively. For example, the side walls of the unloader might be reinforced or thickened. Or an internal reinforcing, such as wires or a mesh, might be used. But any structure which does not involve an extra process or step in manufacture is preferred. The hemispherical portions work quite well. But suitable longitudinal or lateral ribs or thickened portions might be used, if desired. The precise structure involved is not now considered critical as long as the side walls will retain their relative dimensional stability under the air pressure differentials resulting from maximum load and speed on the engine.

While the dust unloader is very inexpensive, it is nevertheless reliable. Some sort of a stiffening device, such as a wire or the like, might be embedded in each lip to change the flexibility characteristics. But it is preferred that the lips be homogeneous.

The hemispherical or convex configuration 66 on each side has the advantage that in the event of an excessive vacuum in the cleaner housing, the unloader will not collapse or flatten. But, at the same time, the lips will prevent dirt from back-flowing up into the cleaner. In a sense, the somewhat hemispherical formation 66 reinforces or strengthens the converging slots such that they will not collapse under the vacuums expected for this use.

Another of the important features is that the air cleaner is compact and for use with automotive engines, such as tractors, trucks, and the like, and is provided with an arrangement whereby the dust is separated from the air and is periodically discharged, on an automatic basis without the requirement for any servicing or otherwise. Further, the overall structure and arrangement is such that the exterior axial dimensions of the cleaner are not increased by any sort of a dust cup or collecting chamber. Note that the unloader and dust port are positioned on the side wall of the housing within the dimensions of the end wall. Thus, everything else being equal, a cleaner of this type can have substantially more capacity and still fit into the same axial underhood space requirements on a tractor, truck, or the like.

Another advantage is that the housing is elongated with the inlet at one end and the dirt discharge at the other. But both of them lie within the end wall dimensions of the overall cylindrical housing. Thus, taking the same outside housing diameter in length, the filter element in a unit of this type will be longer and will, therefore, provide more surface area. Or looking at it the other way, for a given length of filter element the housing length of a cleaner of this type will be shorter than otherwise where a dust cup is located on the end.

While I have shown and described one form of the invention, it should be understood that the particular form shown is merely one of several physical embodiments. For example, under certain circumstances, the invention may be applied or used in an air cleaner which has the cyclonic or centrifugal action and the filtering action in separate housings. Further, in certain circumstances, the unit may be used merely as a so-called precleaner. In this case, the filter element 16 would not necessarily be present in the housing, and the dust unloader would perform the same function.

I claim:

1. In an air cleaner assembly for use with an internal combustion engine, a housing having an inlet for dirty air, a clean air outlet on the housing adapted to be connected to the intake of an internal combustion engine, a dust port on the housing for discharging dust therefrom separated from the air, and a dust unloader on the dust port adapted to discharge the dust from the housing, including at least two generally parallel closely spaced flexible lips, the lips being slightly separated when the dust unloader is at rest, but sufficiently flexible such that they will come together and close under an air pressure differential caused by vacuum in the housing of the cleaner assembly and atmospheric pressure on the outside thereby preventing the entrance of air into the housing through the dust port, the lips being spaced a predetermined distance below the dust port thereby providing an unobstructed vertical height above the lips such that a column of dust will collect therein, creating a sufficient head pressure to open the lips and discharge dust against the action of the air pressure differential thereon, the unobstructed vertical height being related to engine operating conditions such that at the maximum air pressure differential, as represented by full load on the engine, which causes the lips to come together under maximum pressure, the height of the dust column which will accumulate in the unobstructed vertical height will be sufficient to overcome the maximum air pressure differential thereby causing the lips to separate and the dust unloader to unload, and a wall structure above the lips at least in part defining the vertical height and constructed to retain its relative dimensional stability under the various pressure differentials of all loads and speeds of the engine.

2. The structure of claim 1 further characterized in that the lips are generally rectilinear.

3. The structure of claim 1 further characterized by and including a generally cylindrical adapter mounted on the housing around the dust port and open at both ends, the dust unloader being telescoped over the adapter and extending below it, terminating in the flexible lips, the lips being in spaced relation to the lower end of the adapter.

4. The structure of claim 1 further characterized in that the wall structure includes somewhat hemispherical formations, convexed outwardly, to prevent collapsing of the unloader under extreme pressure differentials.

5. The structure of claim 4 further characterized in that the lips are arcuate along their lower end conforming generally to the hemispherical formations.

References Cited by the Examiner

UNITED STATES PATENTS

| | | | |
|---|---|---|---|
| Re. 16,389 | 7/1926 | Garner | 55—459 X |
| 602,964 | 4/1898 | Van Gelder | 55—432 X |
| 615,751 | 12/1898 | Sands | 137—525.1 |
| 768,962 | 8/1904 | Strasburger | 137—525.1 X |
| 837,705 | 12/1906 | Morse | 55—428 X |
| 1,444,384 | 2/1923 | Patitz | 55—417 X |
| 1,505,744 | 8/1924 | Stebbins | 55—419 X |
| 1,576,331 | 3/1926 | Kelly et al. | 137—525.1 X |
| 1,689,104 | 10/1928 | Bennett | 55—429 X |
| 1,702,804 | 2/1929 | Winslow | 55—426 X |
| 1,791,732 | 2/1931 | Manchester | 55—429 X |
| 1,953,948 | 4/1934 | Bieth | 55—459 X |
| 2,347,988 | 5/1944 | Burke | 137—525.1 X |
| 2,371,449 | 3/1945 | Langdon | 55—428 X |
| 2,687,782 | 8/1954 | Sonderegger | 55—454 X |
| 2,772,817 | 12/1956 | Jauch | 55—432 X |
| 2,792,910 | 5/1957 | Redniss | 55—425 |
| 2,808,893 | 10/1957 | Dorman et al. | |
| 2,890,081 | 6/1959 | Terrett | 55—428 X |
| 2,897,972 | 8/1959 | Cannon | 55—432 X |
| 2,948,297 | 8/1960 | Langdon | 137—525.1 |
| 2,973,830 | 3/1961 | Gruner | 55—337 |
| 2,982,446 | 5/1961 | Liolios et al. | 137—525.1 |
| 3,060,882 | 10/1962 | Peters et al. | 137—525.1 X |

FOREIGN PATENTS

| | | |
|---|---|---|
| 82,754 | 1/1957 | Denmark. |
| 420,995 | 12/1934 | Great Britain. |
| 754,497 | 8/1956 | Great Britain. |
| 537,166 | 12/1955 | Italy. |
| 145,259 | 5/1954 | Sweden. |

HARRY B. THORNTON, *Primary Examiner.*

D. TALBERT, *Assistant Examiner.*